US007872559B2

(12) United States Patent
Asano

(10) Patent No.: US 7,872,559 B2
(45) Date of Patent: *Jan. 18, 2011

(54) WINDING METHOD AND COIL UNIT

(75) Inventor: Mitsutoshi Asano, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 173 days.

This patent is subject to a terminal disclaimer.

(21) Appl. No.: 12/085,354

(22) PCT Filed: Nov. 2, 2006

(86) PCT No.: PCT/JP2006/322428

§ 371 (c)(1),
(2), (4) Date: May 22, 2008

(87) PCT Pub. No.: WO2007/077674

PCT Pub. Date: Jul. 12, 2007

(65) Prior Publication Data

US 2009/0179725 A1 Jul. 16, 2009

(30) Foreign Application Priority Data

Dec. 26, 2005 (JP) ............... 2005-373336

(51) Int. Cl.
H01F 27/30 (2006.01)
H01F 27/28 (2006.01)
G11B 23/04 (2006.01)
B21F 3/04 (2006.01)

(52) U.S. Cl. ............. 336/198; 336/186; 336/188; 336/208; 336/222; 336/223; 242/347; 242/437.3

(58) Field of Classification Search ........... 336/186, 336/222, 223, 188, 198, 208; 242/347, 437.3
See application file for complete search history.

(56) References Cited

U.S. PATENT DOCUMENTS 1,456,108 A * 5/1923 Johannesen ............... 336/208
2,930,014 A * 3/1960 Van Der Hoek et al. .... 336/190

(Continued)

FOREIGN PATENT DOCUMENTS

DE 28 27 621 1/1980

(Continued)

OTHER PUBLICATIONS

International Search Report.

(Continued)

Primary Examiner—Elvin G Enad
Assistant Examiner—Tszfung Chan
(74) Attorney, Agent, or Firm—Finnegan, Henderson, Farabow, Garrett & Dunner, LLP

(57) ABSTRACT

A rectangular coil unit 1 is manufactured in such a manner that four wires 2 are simultaneously regularly wound on four outer surfaces of a bobbin 3 having a rectangular section so that the wires 2 advance obliquely together for a lane change corresponding to 0.5 wire on one (a lower surface side) of a pair of parallel surfaces of the four outer surfaces of the bobbin 3 and for a lane change corresponding to 3.5 wires on the other one (an upper surface side) of the parallel surfaces.

4 Claims, 18 Drawing Sheets

U.S. PATENT DOCUMENTS

| | | | |
|---|---|---|---|
| 2,937,350 A * | 5/1960 | Sasaki | 336/183 |
| 3,851,830 A * | 12/1974 | Barthalon | 336/208 |
| 4,258,467 A | 3/1981 | Witte | |
| 4,352,081 A * | 9/1982 | Kijima | 336/198 |
| 4,454,492 A * | 6/1984 | Thackray | 336/69 |
| 4,988,055 A * | 1/1991 | Sakai et al. | 242/159 |
| 5,692,483 A | 12/1997 | Wada et al. | |
| 6,499,689 B1 | 12/2002 | Miyazaki | |
| 6,535,095 B2 | 3/2003 | Aoki et al. | |
| 7,614,579 B2 | 11/2009 | Asano | |
| 2003/0209627 A1 * | 11/2003 | Kawano et al. | 242/443 |

FOREIGN PATENT DOCUMENTS

| | | |
|---|---|---|
| JP | 2-116107 | 4/1990 |
| JP | 8-203720 | 8/1996 |
| JP | 2000-245092 | 9/2000 |
| JP | 2000-348959 | 12/2000 |
| JP | 2003100531 A * | 4/2003 |
| JP | 2007-067171 | 3/2007 |

OTHER PUBLICATIONS

Office Action for U.S. Appl. No. 12/085,910 mailed Mar. 5, 2010.
English-language translation of Notification of Reason(s) for Refusal for Japanese Appl. No. 2005-373336 dated Feb. 10, 2009.

* cited by examiner

WINDING METHOD AND COIL UNIT

TECHNICAL FIELD

The present invention relates to a winding method of regularly winding wires on a bobbin, and a coil unit manufactured by the method.

BACKGROUND ART

This type of technique has been know as a winding method disclosed in each of Japanese unexamined patent publications Nos. 2000-245092, 8(1996)-203720, and 2000-348959. Of them, for example, the publication '092 discloses a winding method for concentrated winding, intended to prevent enlargement of coil size and achieve a reduction in coil size, by providing a layer shift part and a row shift part of a coil in separate positions on the periphery of the coil. The publication '720 discloses a method of regularly winding a wire in multilayered form on a bobbin while feeing the wire at ½ pitch of a wire diameter on two opposite surfaces of a rectangular coil.

DISCLOSURE OF INVENTION

Problems to be Solved by the Invention

The winding methods disclosed in the publications '092 and '720 are however the winding methods of winding a single wire on a bobbin and not particularly directed to winding of a plurality of wires. In a manufacturing process for a regularly concentrated winding coil, generally, a raised portion of the wound wires is likely to be generated near an end of the bobbin. This would result from inclination and floating of the wire at a row shift part and a layer shift part in the regularly winding, namely, in the winding turn-back position. The regularly concentrated winding coil is likely to disorder the arrangement of the wires in the turn-back portions, which is one of factors causing enlargement of a coil outer size, leading to obstruction of miniaturization of the concentrated winding coil. In terms of enhancement of productivity, it is conceivable to simultaneously regularly wind a plurality of wires. For example, if four wires are wound, however, there is a fear that the arrangement of the wires becomes complicated in the winding turn-back positions. Thus, an effective winding method has been demanded.

The present invention has been made in view of the above circumstances and has an object to provide a method of regularly winding four wires, capable of preventing the occurrence of a raised portion of the wires in the winding turn-back position, thereby achieving a compact coil, and a coil manufactured by the winding method.

Means for Solving the Problems

To achieve the above object, the present invention provides a winding method of regularly winding four wires on a bobbin that is rectangular in section, having four outer surfaces including a pair of parallel surfaces, the method comprising the step of: winding the wires on the bobbin so that the wires advance obliquely together for a lane change corresponding to 0.5 wire on one of the pair of parallel surfaces and for a lane change corresponding to 3.5 wires on the other one of the pair of parallel surfaces.

According to the above structure, the wires are wound in such a manner as to advance obliquely together for the lane change corresponding to 0.5 wire (i.e. a half wire diameter) on one surface side of the pair of parallel surfaces of the four outer surfaces of the bobbin and the lane change corresponding to 3.5 wires (i.e. three and a half wire diameters) on the other surface side of the parallel surfaces. This method can provide less inclination of the wires as compared with for instance the lane change corresponding to 4 wires on one of the outer surfaces of the bobbin, with a consequent result that intersection of layered wires in the winding turn-back position can be reduced. Further, differing from the case where the lane change corresponding to 2 wires is performed on each of parallel surfaces of four outer surfaces of the bobbin, the present invention does not cause two of the four wires to be left uncoiled in the turn-back position where the winding is completed. Besides, the following combinations of lane changes are conceivable; for example, a case where a lane change corresponding to 1 wire is performed on one of the parallel surfaces and a lane change corresponding to 3 wires is performed on the other surface; a case where a lane change corresponding to 1.5 wires is performed on one of the parallel surfaces and a lane change corresponding to 2.5 wires is performed on the other surface; and a case where a lane change corresponding to 2.5 wires is performed on one of the parallel surfaces and a lane change corresponding to 1.5 wires is performed on the other surfaces. Comparing those cases, the present invention can reduce intersection of the layered wires in the winding turn-back position, thus preventing the wires from remaining uncoiled in the winding end position.

According to the aforementioned invention, it is possible to prevent the generation of a raised portion in the winding turn-back positions when four wires are regularly wound, thereby achieving a compact coil without enlarging the outer coil size.

In the above structure, preferably, the winding method is used to manufacture a rectangular coil unit including a coil having a rectangular section.

According to the above structure, the same operations and effects as above can be attained for a coil of a rectangular coil unit.

Alternatively, on the above structure, preferably, the winding method is used to manufacture a trapezoidal coil unit including a coil having a trapezoidal section.

According to the above structure, the same operations and effects as above can be attained for a coil of a trapezoidal coil.

According to another aspect, the present invention provides a coil unit including four wires regularly wound on a bobbin that is rectangular in section and has four outer surfaces including a pair of parallel surfaces, wherein the wires are wound on the bobbin so that the wires advance obliquely together for a lane change corresponding to 0.5 wire on one of the pair of parallel surfaces and a lane change corresponding to 3.5 wires on the other one of the pair of parallel surfaces.

According to the above structure, the wires are wound to advance obliquely together for the lane change corresponding to 0.5 wire (i.e. a half wire diameter) on one surface side of the pair of parallel surfaces of the four outer surfaces of the bobbin and the lane change corresponding to 3.5 wires (i.e. three and a half wire diameters) on the other surface side of the parallel surfaces. Thus, the coil of the present invention can include less inclination of the wires as compared with for instance the lane change corresponding to 4 wires on one of the outer surfaces of the bobbin, with a consequent result that intersection of layered wires in turn-back positions of winding can be reduced. Further, differing from the case where the lane change corresponding to 2 wires is performed on each of parallel surfaces of four outer surfaces of the bobbin, the present invention does not cause two of the four wires to be left uncoiled in the turn-back position where the winding is completed. Besides, the following combinations of lane changes are conceivable; for example, a case where a lane change corresponding to 1 wire is performed on one of the parallel surfaces and a lane change corresponding to 3 wires is performed on the other surface; a case where a lane change corresponding to 1.5 wires is performed on one of the parallel surfaces and a lane change corresponding to 2.5 wires is performed on the other surface; and a case where a lane change corresponding to 2.5 wires is performed on one of the parallel surfaces and a lane change corresponding to 1.5 wires is performed on the other surfaces. Comparing those cases, the present invention can reduce intersection of the layered wires in the winding turn-back positions, thus preventing the wires from remaining uncoiled in the winding end position.

According to the aforementioned invention, it is possible to prevent the generation of a raised portion in the winding turn-back positions when four wires are regularly wound, thereby achieving a compact coil without enlarging the outer coil size.

BEST MODE FOR CARRYING OUT THE INVENTION

A detailed description of a preferred embodiment of a winding method of the present invention applied to a rectangular coil unit will now be given referring to the accompanying drawings.

Figure 1:
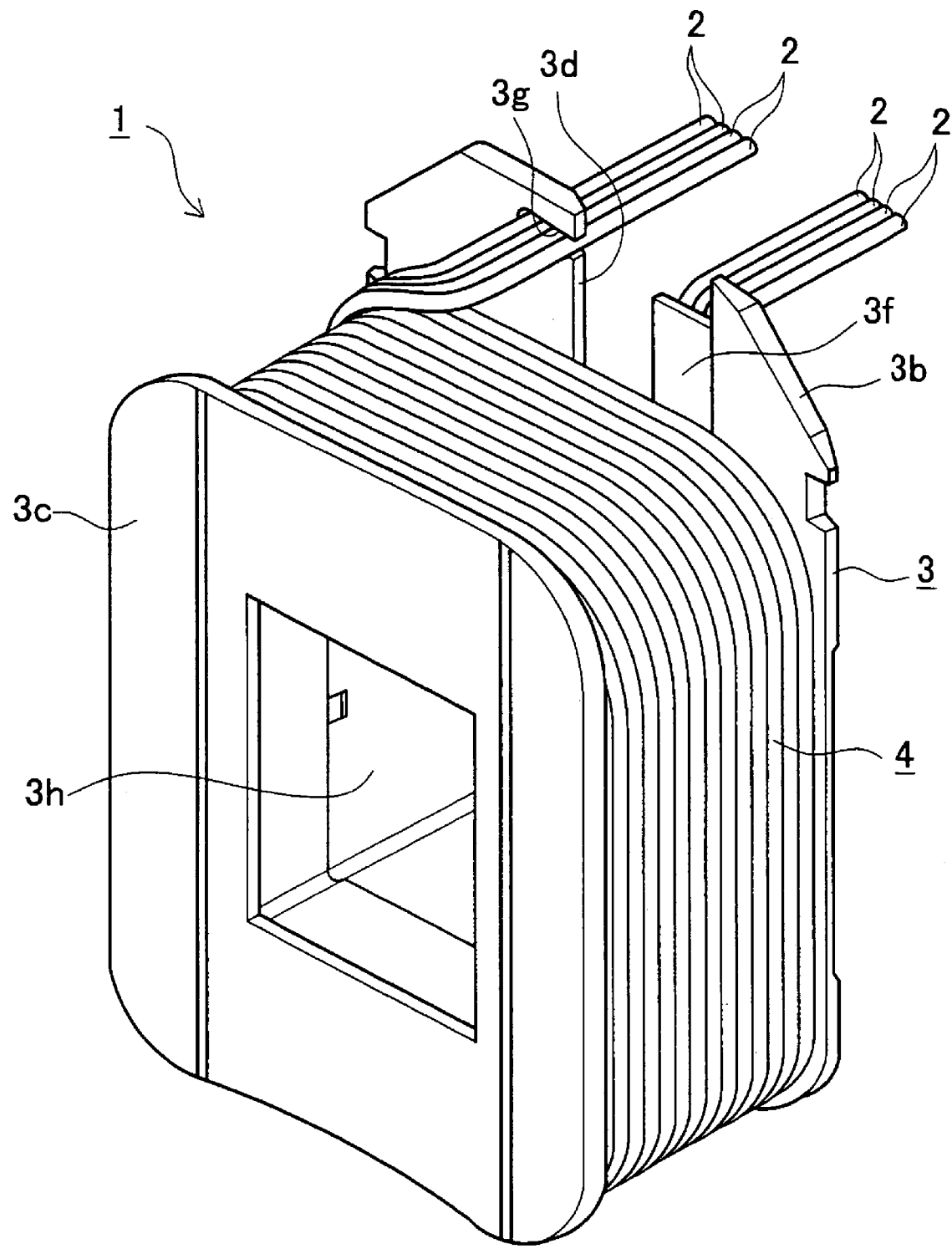
FIG. 1 is a perspective view of a rectangular coil unit.
Figure 2:
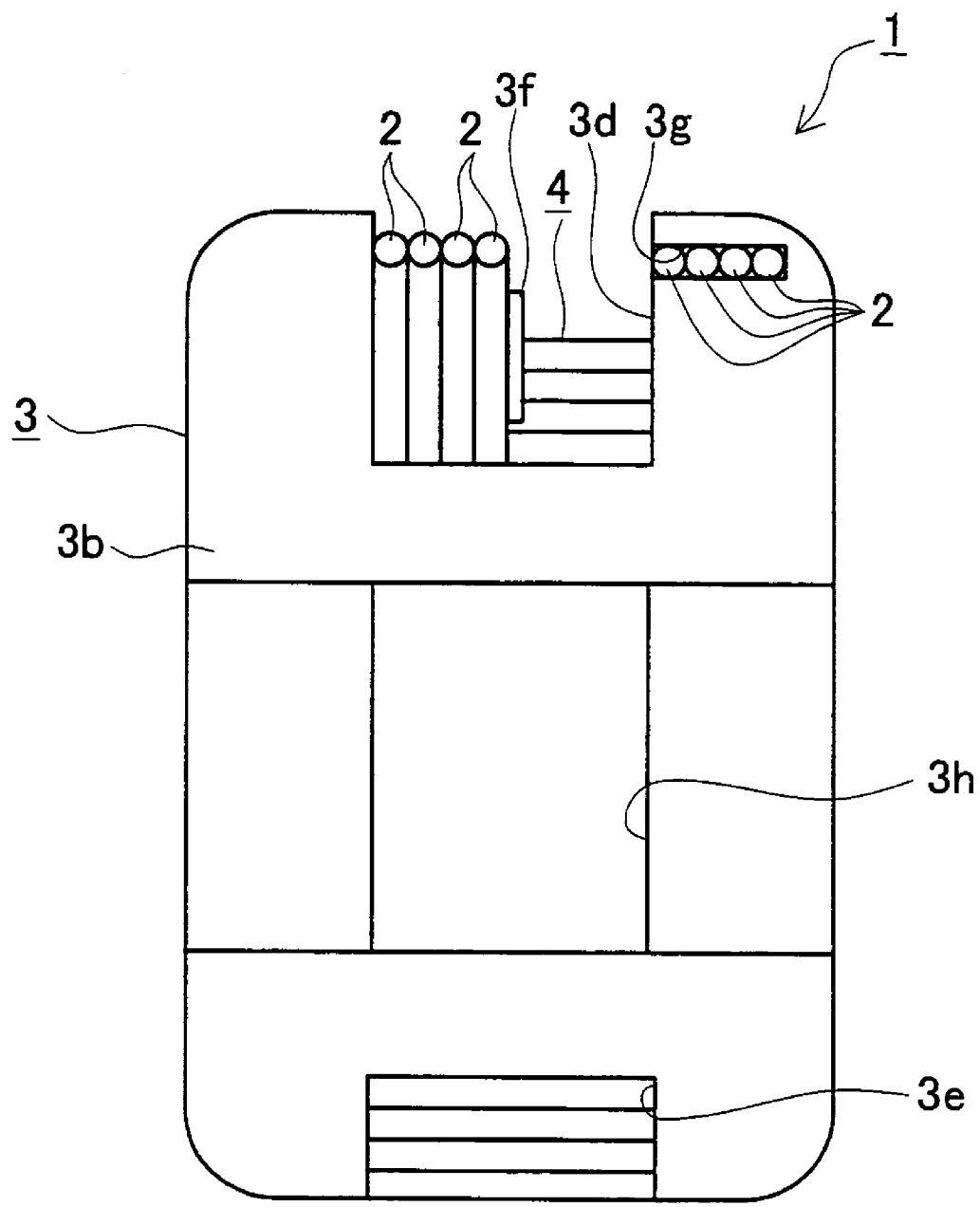
FIG. 2 is a back view of the rectangular coil unit.
Figure 3:
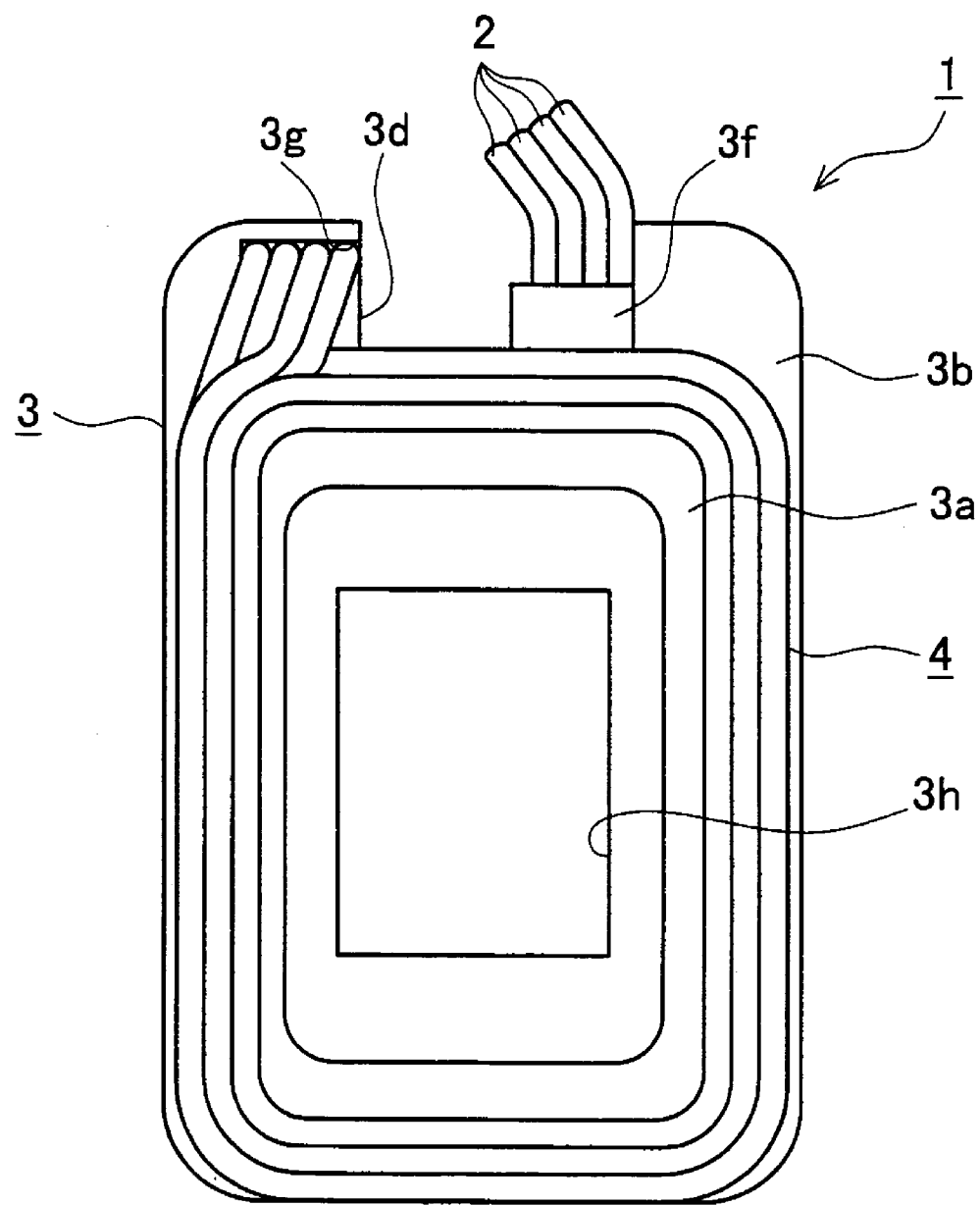
FIG. 3 is a front view of the rectangular coil unit from which a first flange is removed for convenience of explanation.

FIG. 1 is a perspective view of a rectangular coil unit 1 in the present embodiment. FIG. 2 is a back view of the rectangular coil unit 1. FIG. 3 is a front view of the rectangular coil unit 1 from which a first flange is removed for convenience of explanation. The rectangular coil unit 1 in the present embodiment is manufactured in such a manner that four wires 2 are simultaneously regularly wound on four outer surfaces of a bobbin 3 having a rectangular section. A plurality of the rectangular coil units 1 will be mounted in a plurality of teeth formed on the inner periphery of a stator core, thus constituting a stator. This stator is further assembled with a rotor, producing a motor.

The bobbin 3 includes a core tube 3a of a rectangular section, a first flange 3b and a second flange 3c formed at both axial ends of the core tube 3a. The bobbin 3 is made of a synthetic resin such as PPS (polyphenylene sulfide) to have an insulating property. The first flange 3b provided on a rear side has a distinctive shape as compared with the second flange 3c provided on a front side having a nearly normal rectangular shape. Specifically, the first flange 3b includes upper and lower cutout portions 3d and 3e, an insulating wall 3f protruding from one of side surfaces of the upper cutout portion 3d in FIG. 3 toward the other side surface, and a stopper groove 3g formed in the upper portion. The core tube 3a is hollow, providing a center hole 3h. A clearance is formed between the insulating wall 3f and a lower surface of the upper cutout portion 3d as shown in FIG. 2. Onto the core tube 3a, four wires 2 are simultaneously regularly wound, forming a coil 4 having a hollow rectangular shape. Both end portions of each of four wires 2 are partly engaged with the insulating wall 3f and the stopper groove 3g. In the present embodiment, a relatively thick wire 2 is used to achieve a small-sized high-power motor. The wire 2 is made of a copper wire coated with an enamel insulating film.

In the above rectangular coil unit 1, four wires 2 are guided onto the core tube 3a inside the first flange 3b through the clearance between the insulating wall 3f and the lower side of the cutout portion 3d. Those four wires 2 are sequentially wound in a row on the core tube 3a in a direction advancing from the first flange 3b to the second flange 3c, forming a first layer. Then, the wires 2 are turned (folded) back along the second flange 3c and sequentially wound in a row on the first layer in a direction opposite to that for the first layer from the second flange 3c to the first flange 3b, forming a second layer. The four wires 2 are wound regularly and reciprocally in opposite directions along the axis of the core tube 3a as above, forming the coil 4 with a plurality of rows and a plurality of layers of wires 2. After winding, the end portions of the two wires 2 are engaged in the stopper groove 3g. The rectangular coil unit 1 including the coil 4 formed in the above manner to have a rectangular section is thus manufactured.

Figure 4:
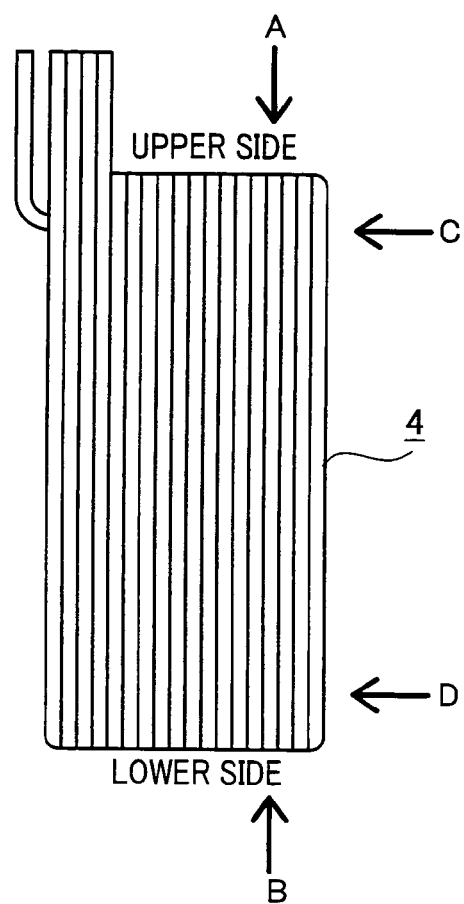
FIG. 4 is a side view of a coil on a bobbin.
Figure 5:
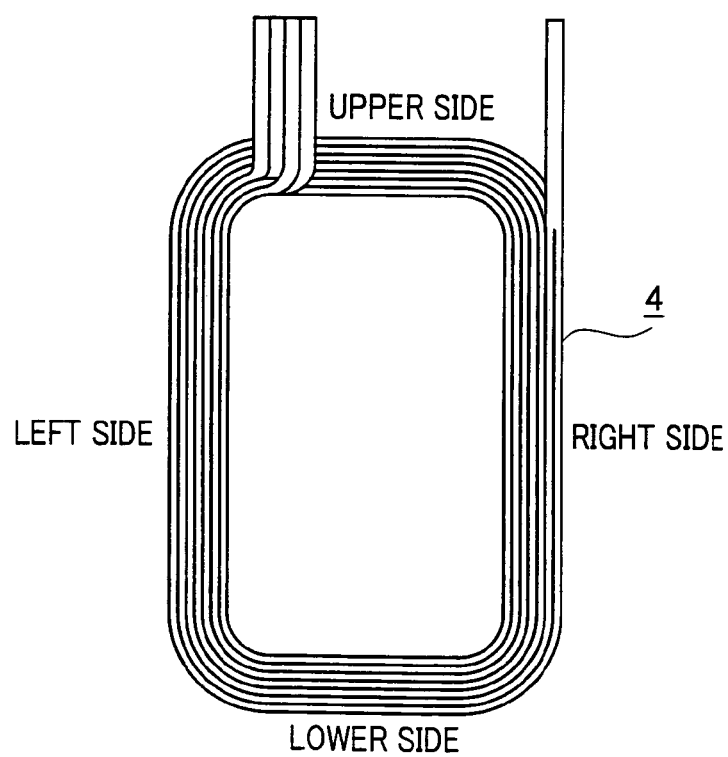
FIG. 5 is a back view of the coil on the bobbin.

The wiring method in the present embodiment has special features in a method of winding four wires 2. FIG. 4 is a side view of the coil 4 on the bobbin 3. FIG. 5 is a back view of the coil 4 on the bobbin 3. FIGS. 6A to 6D are views seen from directions indicated by arrows A, B, C, and D in FIG. 4. FIG. 7 is a pattern diagram of the arrangement of the coil 4 on the bobbin 3. As shown in FIGS. 4 to 7, in the present embodiment, the wires 2 are wound in such a manner as to advance obliquely together for a lane change corresponding to 0.5 wire (i.e. a half wire diameter) on a lower surface side of the core tube 3a of the bobbin 3 having four outer surfaces including a pair of upper and lower parallel surfaces and to advance obliquely together for a lane change corresponding to 3.5 wires (i.e. three and a half wire diameters) on an upper surface side thereof (hereinafter, this winding method is referred to as "3.5-0.5 change"). Thus, the lane changes corresponding to a total of four wire diameters are performed on the upper and lower sides of the bobbin 3.

Figure 6A:
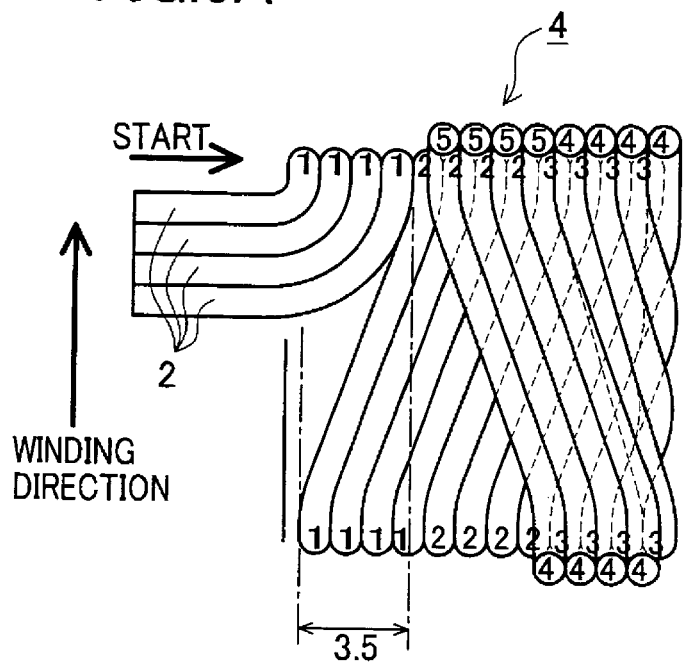
FIGS. 6A to 6D are views seen from directions indicated by arrows A, B, C, and D in FIG. 4.
Figure 6B:
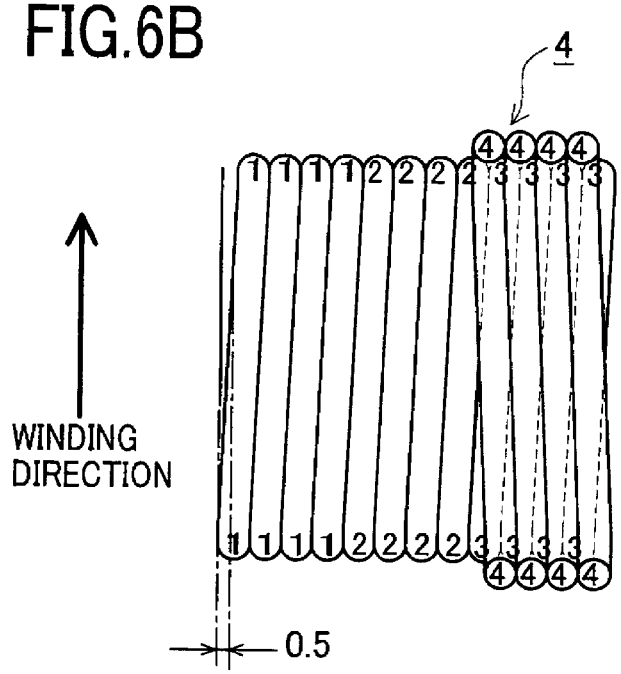
Figure 6C:
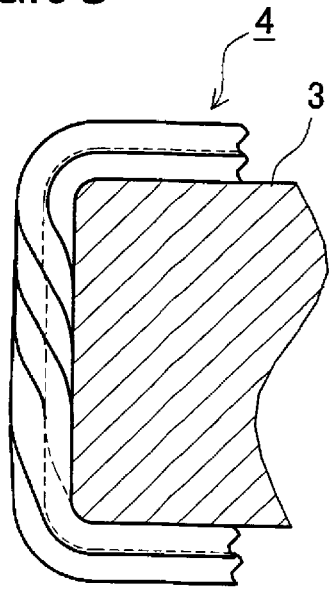
Figure 6D:
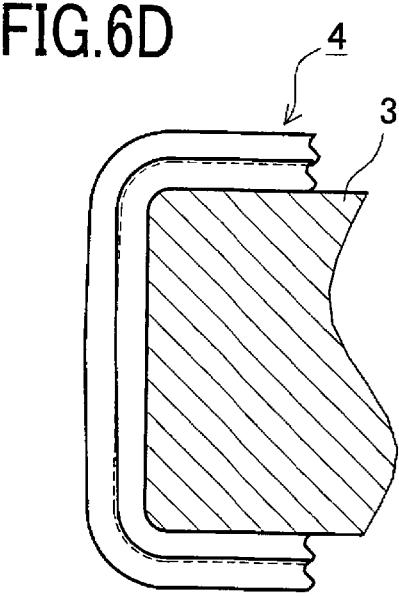
Figure 7:
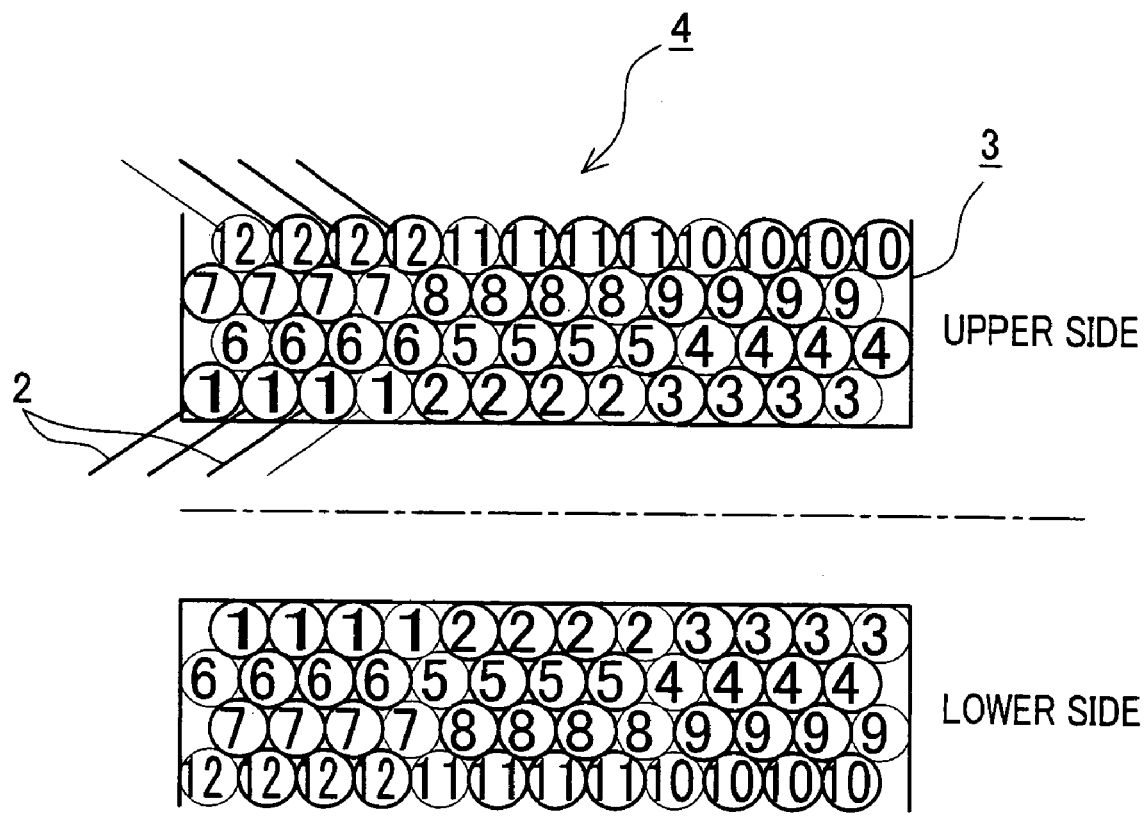
FIG. 7 is a pattern diagram showing an arrangement of the coil on the bobbin.
Figure 8A:
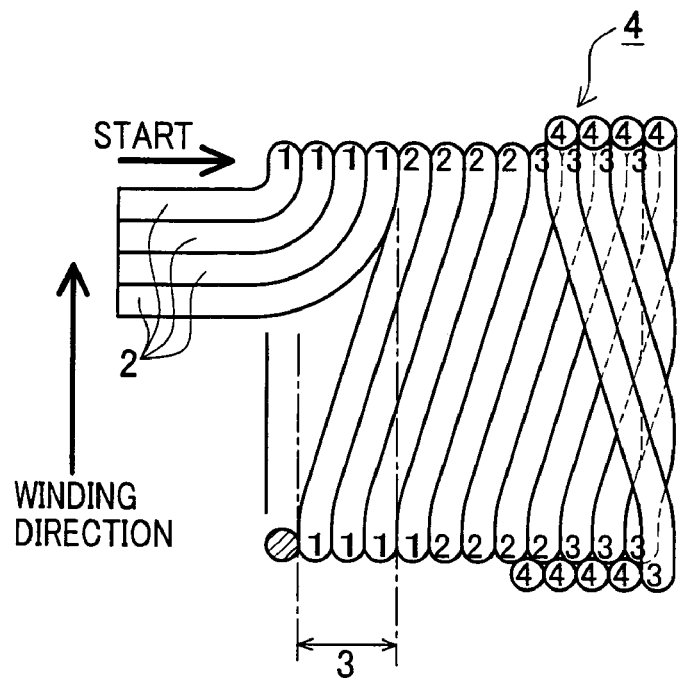
FIGS. 8A to 8D are views seen from directions indicated by arrows A, B, C, and D in FIG. 4.
Figure 8B:
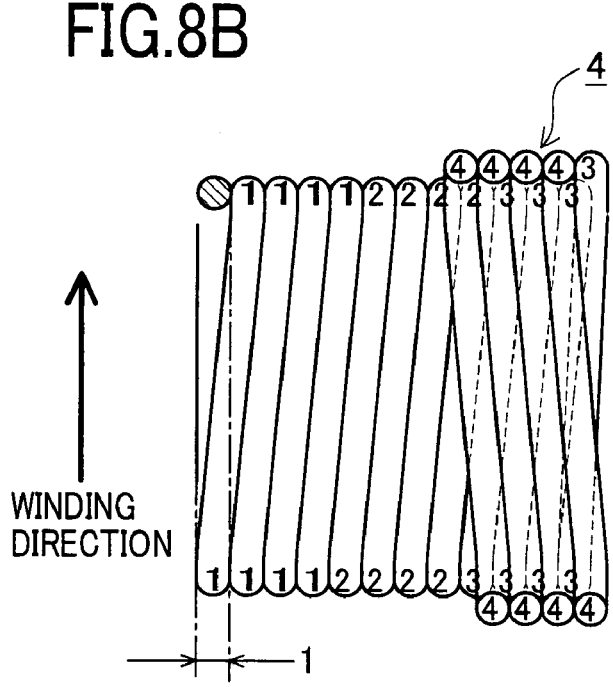
Figure 8C:
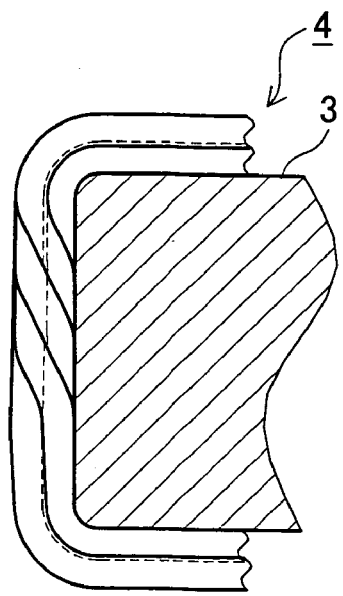
Figure 8D:
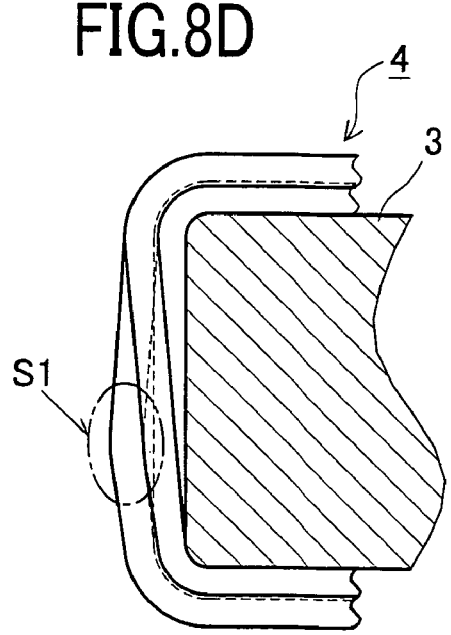

To be concrete, as indicated by number "1" (representing the first turn of the wires 2) in FIGS. 4, 5, and 6A, four wires 2 start to be wound from an upper side and along the first flange 3*b* to a left side, and then vertically downward to a lower side. Successively, the wires 2 advance obliquely together for the 0.5-wire lane change on the lower side, as indicated by number "1" in FIG. 6B, and then vertically upward on a right side to the upper side. As indicated by numbers "1" and "2" in FIG. 6A, on the upper side, the wires 2 advance obliquely together for the 3.5-wire lane change and vertically downward again on the left side to the lower side. Thereafter, the above lane changes are repeated as in the above manner on the upper side and the lower side respectively. The first layer of the coil 4 is thus formed (the first layer has 3 turns as indicated by numbers "1" to "3" in FIGS. 6A and 6B.) After completion of a winding operation for the first layer, the wires 2 are turned (folded) back at an opposite position from the winding start position. On the lower side, the 0.5-wire lane change is performed in the direction opposite to that for the first layer as shown in FIG. 6B. On the upper side, the 3.5-wire lane change is performed conducted in the direction opposite to that the first layer as shown in FIG. 6A.

Figure 9:
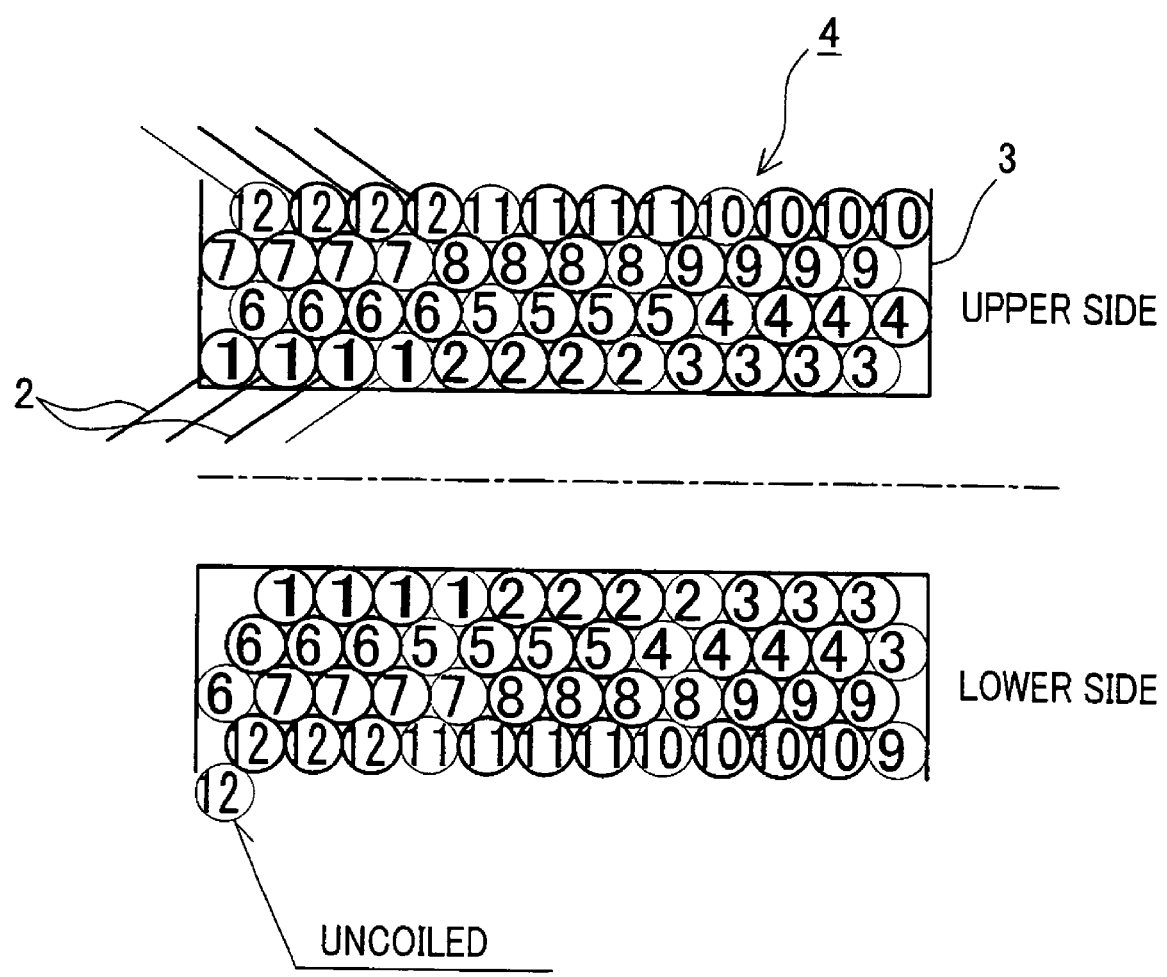
FIG. 9 is a pattern diagram showing another arrangement of the coil on the bobbin.
Figure 10A:
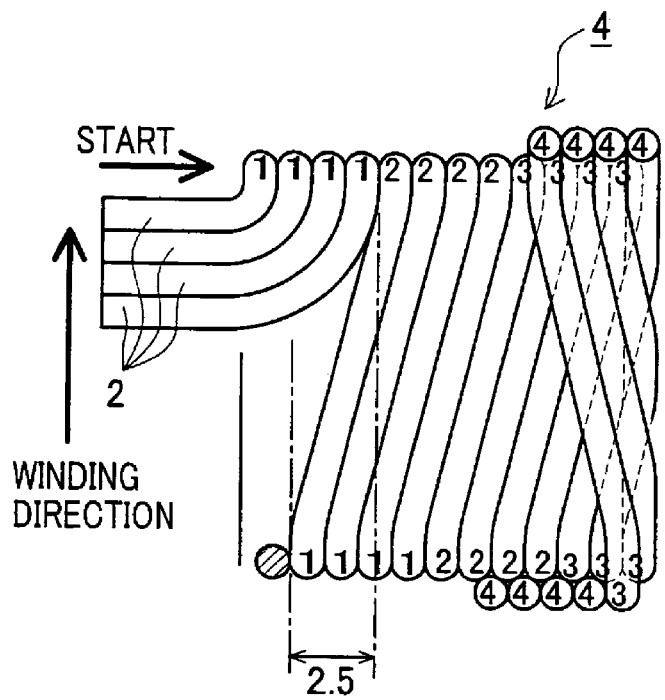
FIGS. 10A to 10D are views seen from directions indicated by arrows A, B, C, and D in FIG. 4.
Figure 10C:
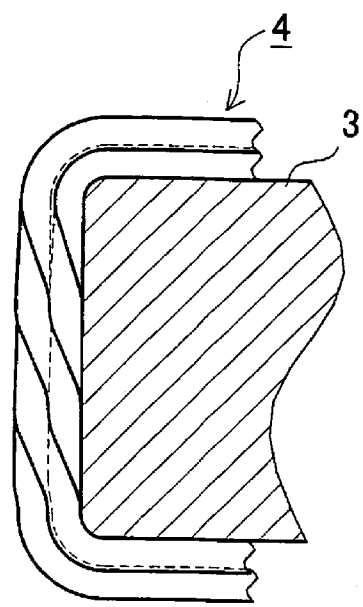
Figure 10B:
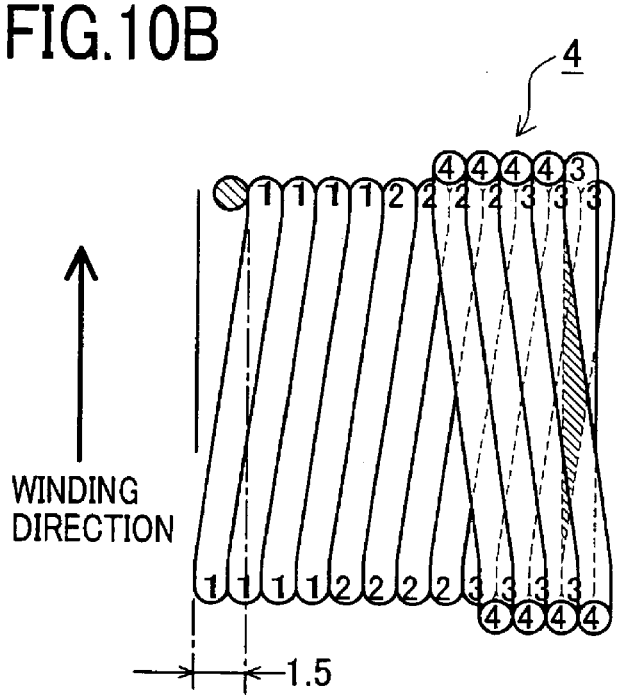
Figure 10D:
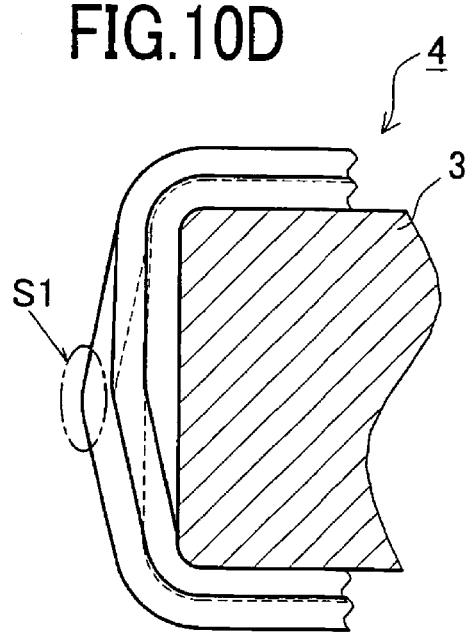

Here, for comparison with the "3.5-0.5 change" in the present embodiment, different winding methods therefrom will be explained. FIGS. 8A to 8D are views seen from the directions indicated by arrows A, B, C, and D in FIG. 4. FIG. 9 is a pattern diagram showing an arrangement of the coil 4 on the bobbin 3. In the winding method shown in FIGS. 8 and 9, four wires 2 are wound in such a manner as to advance obliquely together for a lane change corresponding to 1 wire (i.e. one wire diameter) on the lower surface side of the core tube 3*a* of the bobbin 3 having four outer surfaces including a pair of upper and lower surface and for a lane change corresponding to 3 wires (i.e. three wire diameters) on the upper surface side (hereinafter, this winding method is referred to as "3-1 change"). Thus, the lane changes corresponding to a total of four wire diameters are performed on the upper and lower sides of the bobbin 3. This winding method causes the wires 2 to intersect and overlap in the winding turn-back position, generating a raised portion as shown by a dot-dashed circular line S1 in FIG. 8D. Further, as shown in FIG. 9, an empty space is created in a winding start position of the coil 4. When the winding is completed at the end of the bobbin 3, one of the four wires 2 is left uncoiled in that winding end position.

Figure 11:
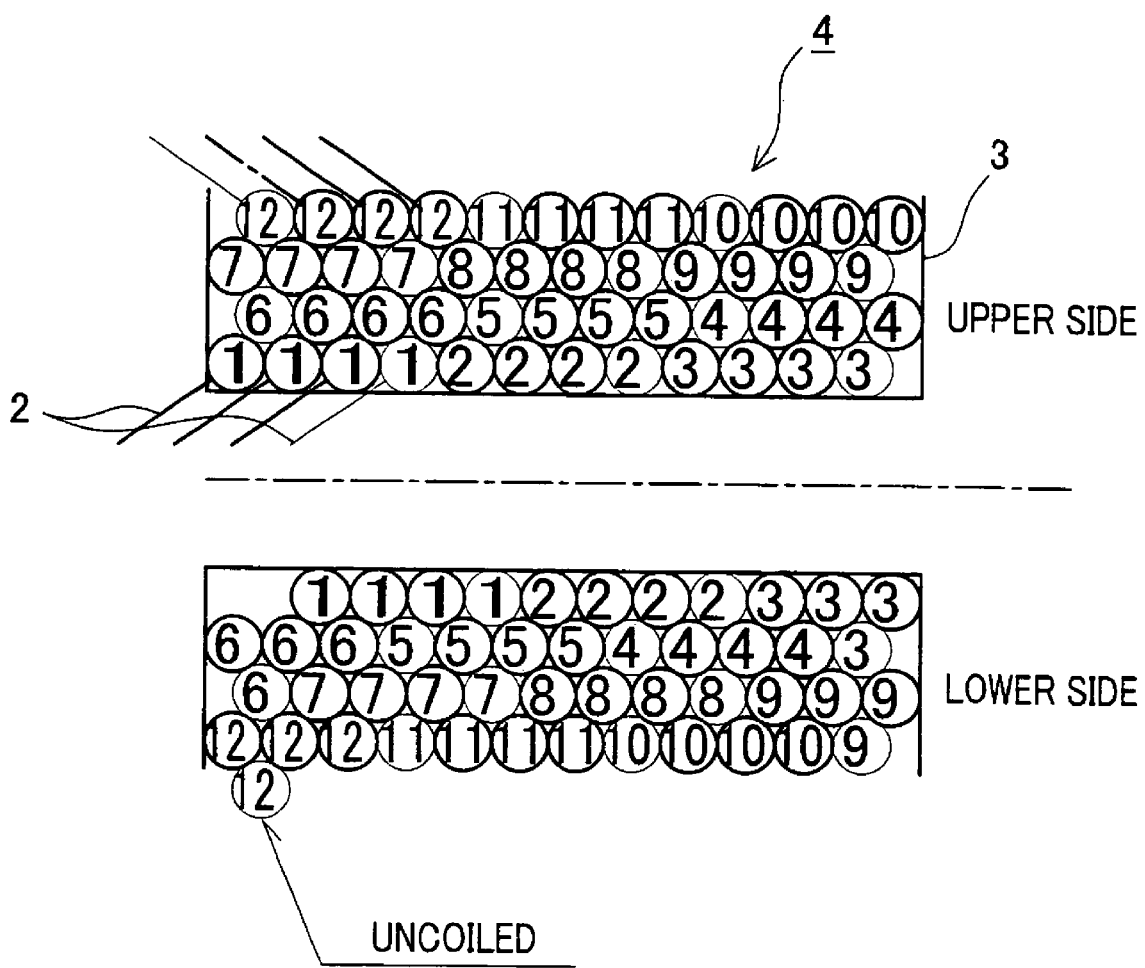
FIG. 11 is a pattern diagram showing another arrangement of the coil on the bobbin.
Figure 12A:
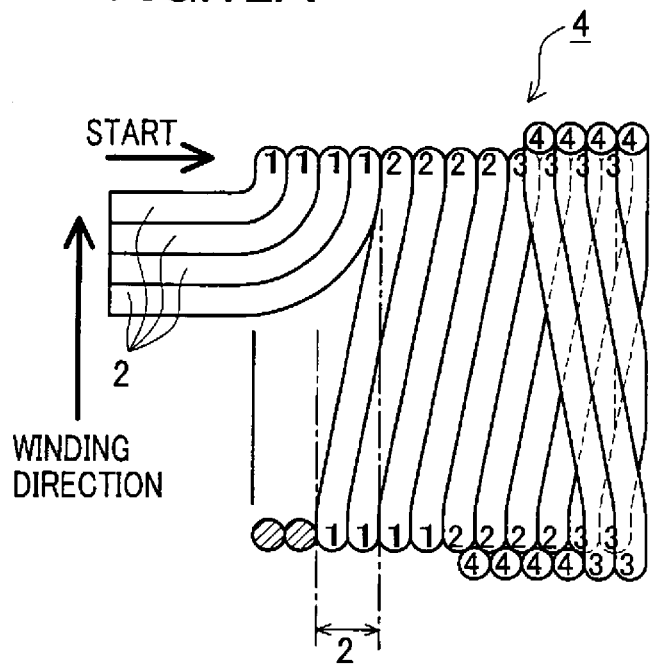
FIGS. 12A to 12D are views seen from directions indicated by arrows A, B, C, and D in FIG. 4.
Figure 12C:
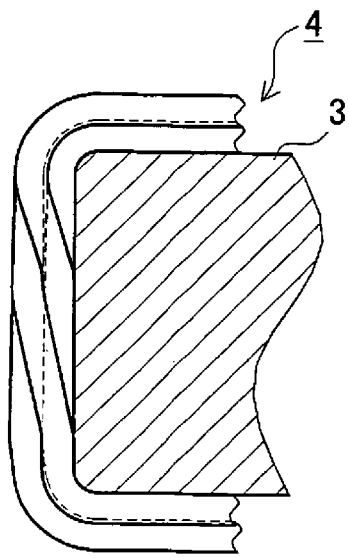
Figure 12B:
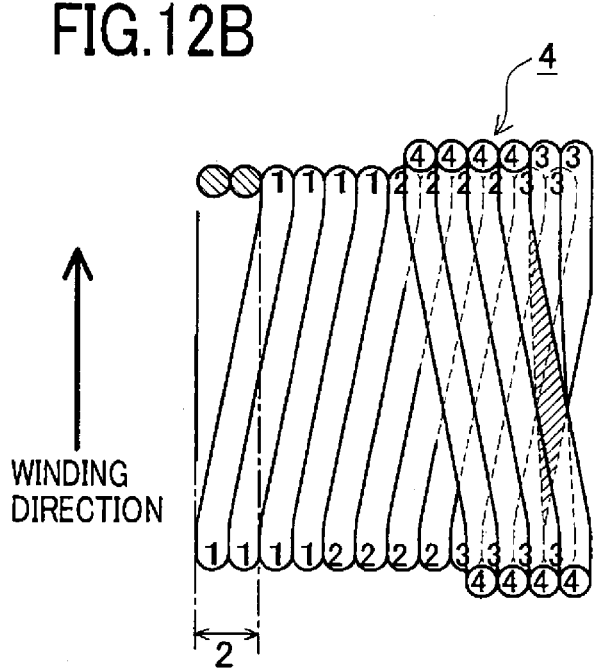
Figure 12D:
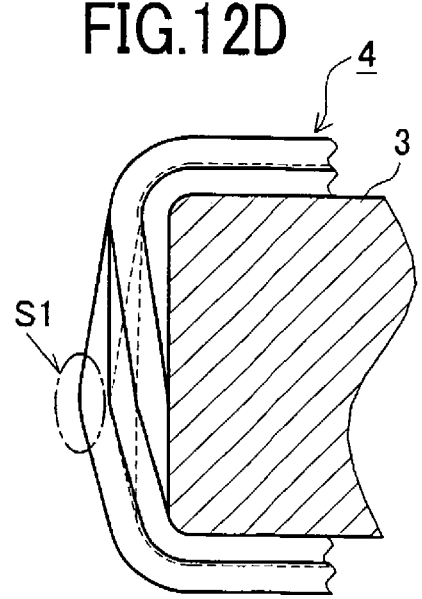

Further, FIGS. 10A to 10D are views seen from the directions indicated by arrows A, B, C, and D in FIG. 4. FIG. 11 is a pattern diagram of the arrangement of the coil 4 on the bobbin 3. In the winding method shown in FIGS. 10 and 11, the wires 2 are wound in such a manner as to advance obliquely together for a lane change corresponding to 1.5 wires (i.e. one and a half wire diameters) on a lower surface side of the core tube 3*a* of the bobbin 3 having four outer surfaces including a pair of upper and lower surface and to advance obliquely together for a lane change corresponding to 2.5 wires (i.e. two and a half wire diameters) on an upper surface side thereof (hereinafter, this winding method is referred to as "2.5-1.5 change"). Thus, the lane changes corresponding to a total of four wire diameters are performed on the upper and lower sides of the bobbin 3. This winding method causes the wires 2 to intersect and overlap in three layers in the winding turn-back position as a shaded area shown in FIG. 10B, generating a raised portion as shown by a dot-dashed circular line S1 in FIG. 10D. Further, as shown in FIG. 11, an empty space is created in a winding start position of the coil 4. When the winding is completed at the end of the bobbin 3, one of the four wires 2 is left uncoiled in that winding end position.

Figure 13:
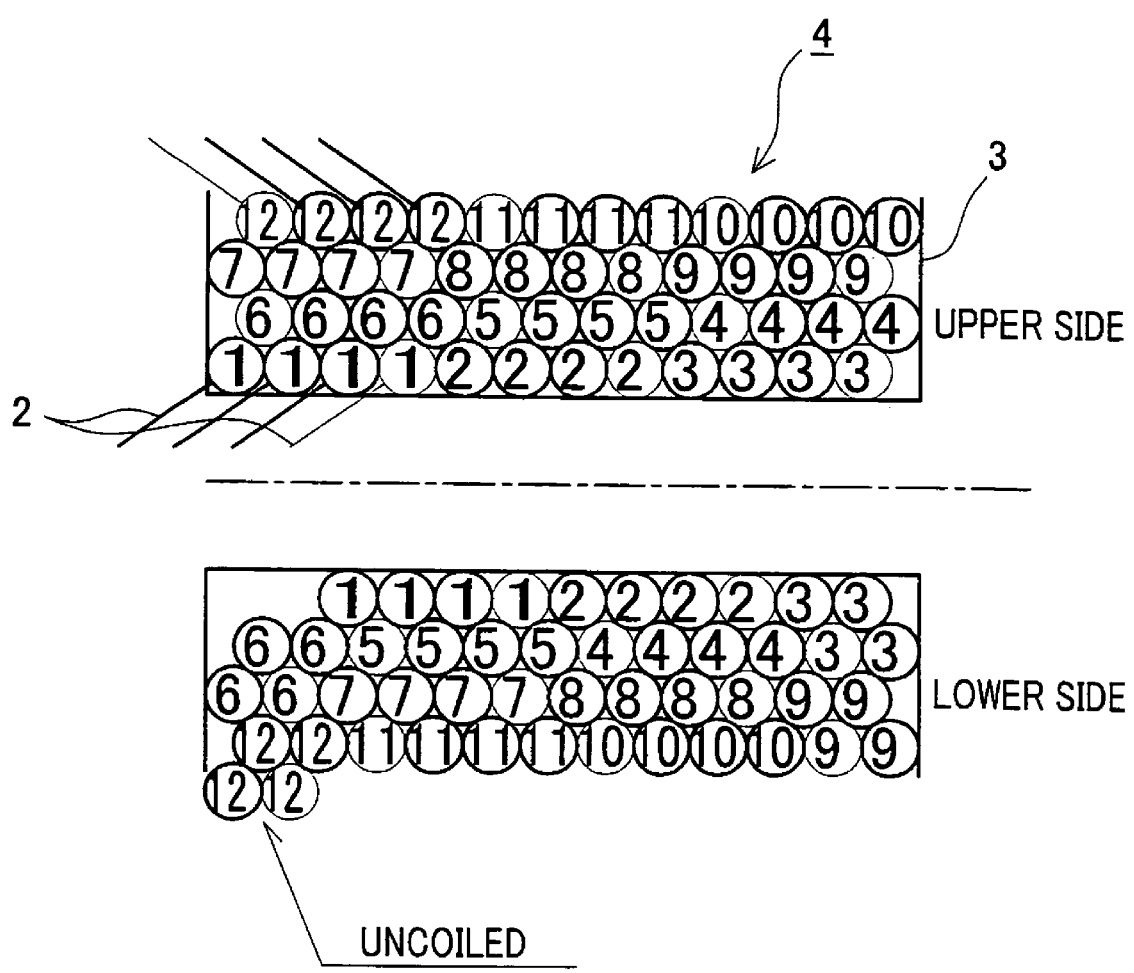
FIG. 13 is a pattern diagram showing another arrangement of the coil on the bobbin.
Figure 14A:
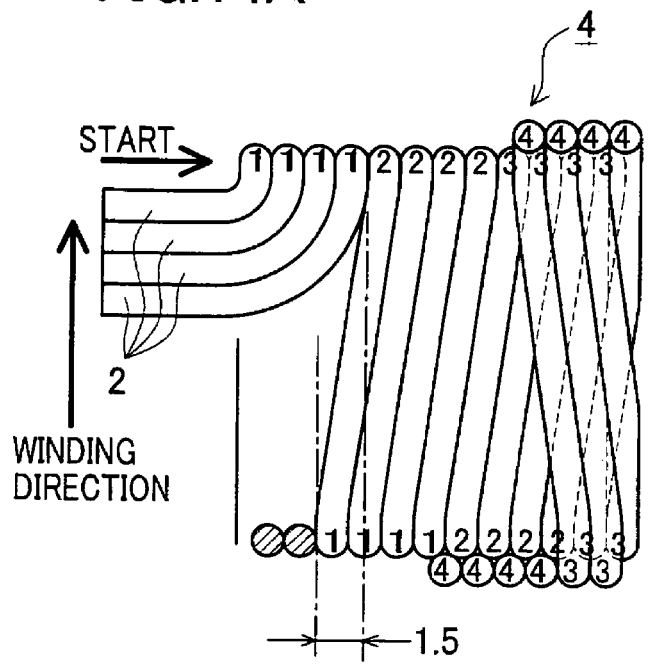
FIGS. 14A to 14D are views seen from directions indicated by arrows A, B, C, and D in FIG. 4.
Figure 14C:
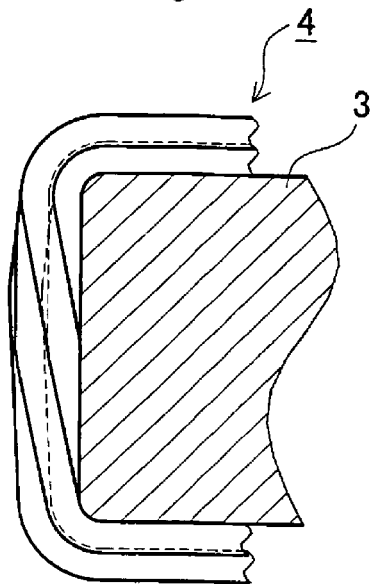
Figure 14B:
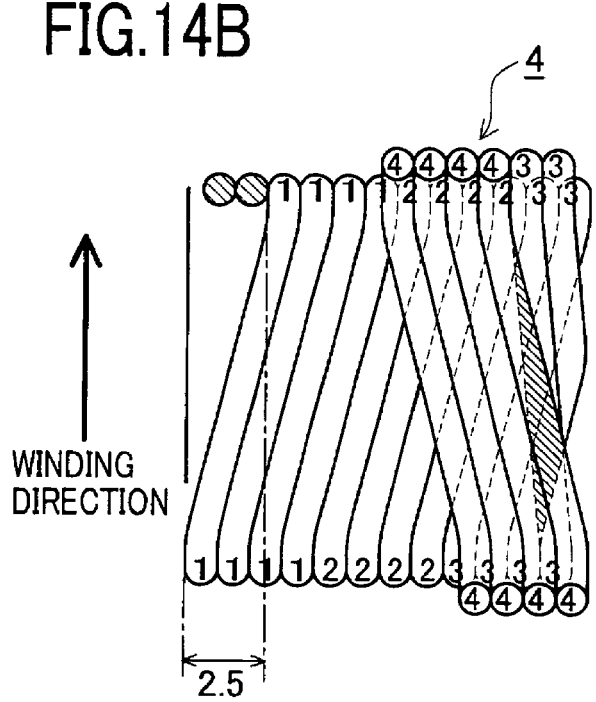
Figure 14D:
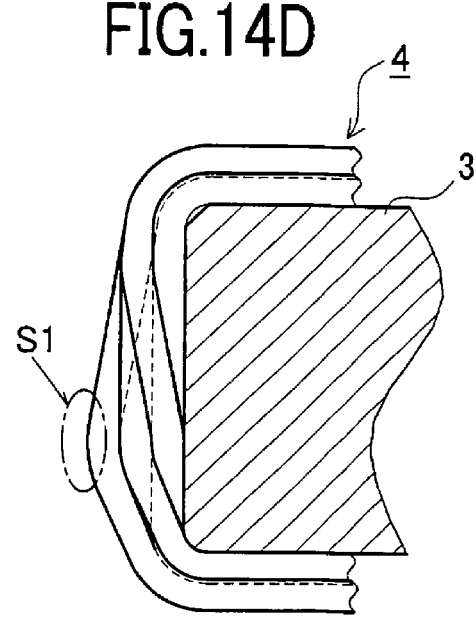

Further, FIGS. 12A to 12D are views seen from the directions indicated by arrows A, B, C, and D in FIG. 4. FIG. 13 is a pattern diagram of the arrangement of the coil 4 on the bobbin 3. In the winding method shown in FIGS. 12 and 13, the wires 2 are wound in such a manner as to advance obliquely together for a lane change corresponding to 2 wires (i.e. two wire diameters) on a lower surface side of the core tube 3*a* of the bobbin 3 having four outer surfaces including a pair of upper and lower surfaces and to advance obliquely together for a lane change corresponding to 2 wires (i.e. two wire diameters) on an upper surface side (hereinafter, this winding method is referred to as "2-2 change"). Thus, the lane changes corresponding to a total of four wire diameters are performed on the upper and lower sides of the bobbin 3. This winding method causes the wires 2 to intersect and overlap in three layers in the winding turn-back position as a shaded area shown in FIG. 12B, generating a raised portion as shown by a dot-dashed circular line S1 in FIG. 12D. Further, as shown in FIG. 13, an empty space is created in a winding start position of the coil 4. When the winding is completed at the end of the bobbin 3, two of the four wires 2 are left uncoiled in that winding end position.

Figure 15:
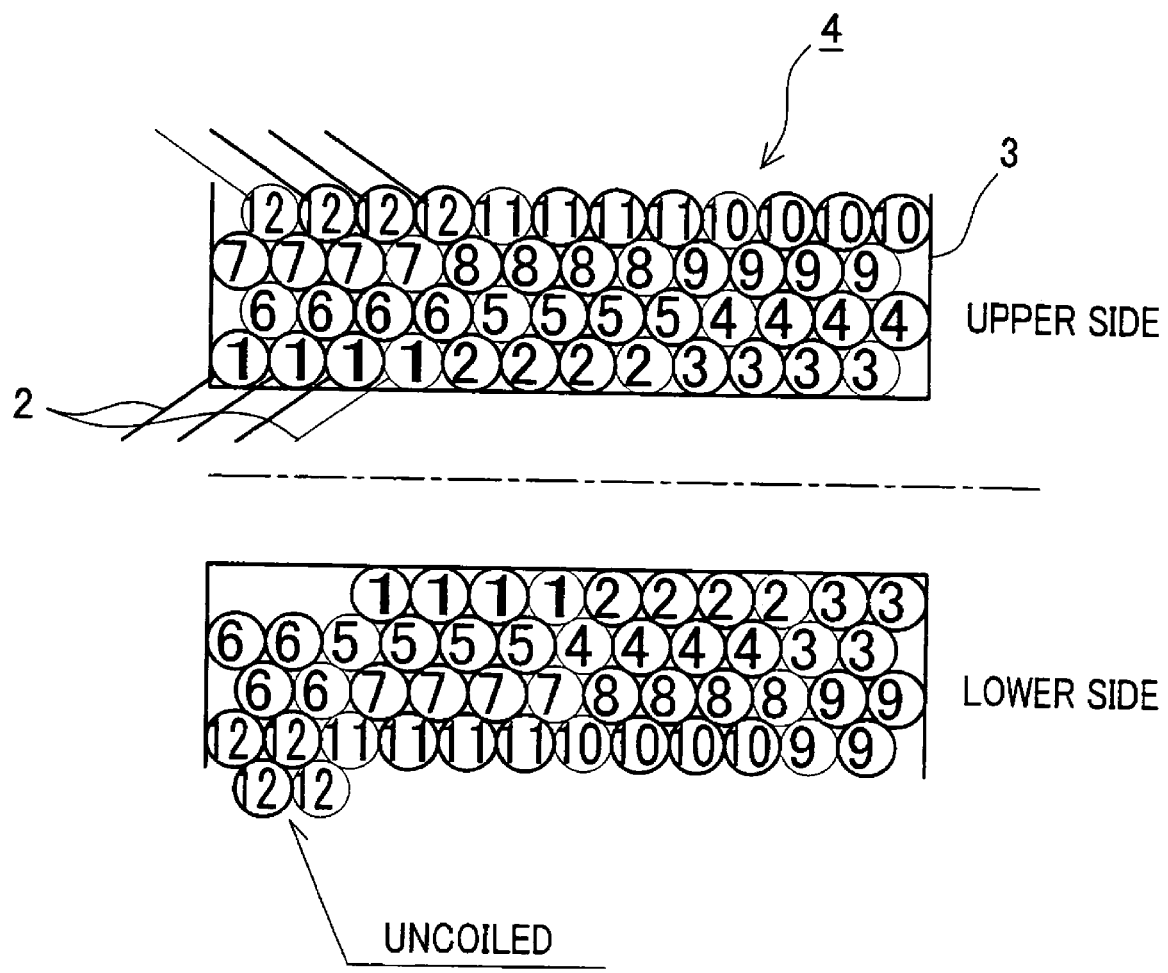
FIG. 15 is a pattern diagram showing another arrangement of the coil on the bobbin.
Figure 16A:
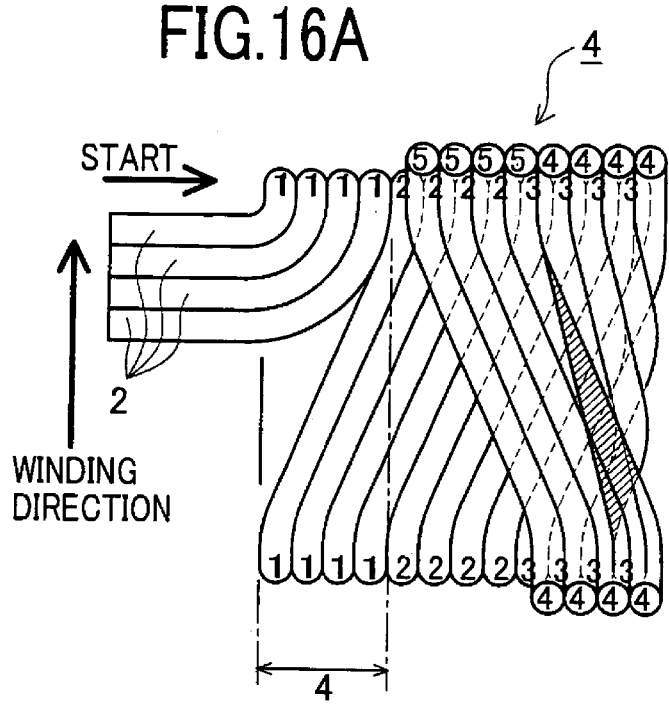
FIGS. 16A to 16D are views seen from directions indicated by arrows A, B, C, and D in FIG. 4.
Figure 16C:
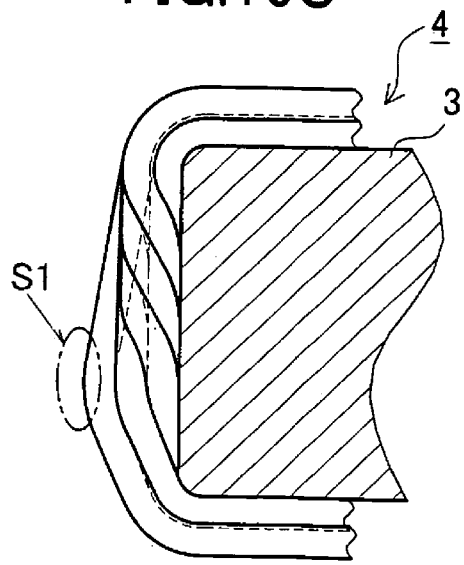
Figure 16B:
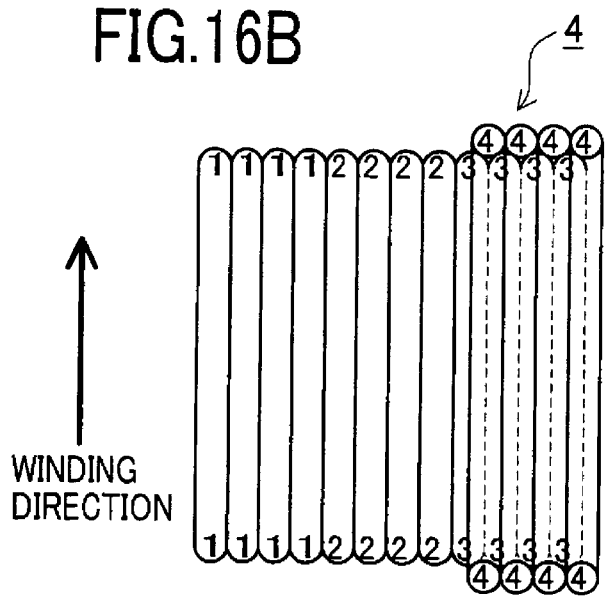
Figure 16D:
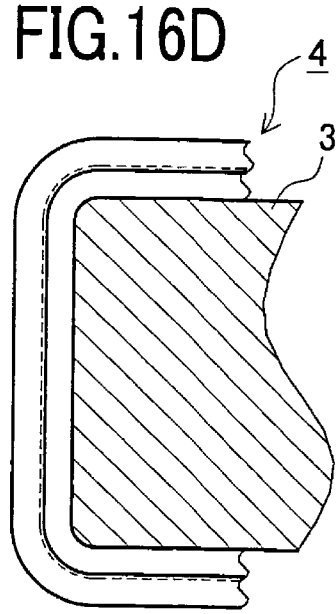

Further, FIGS. 14A to 14D are views seen from the directions indicated by arrows A, B, C, and D in FIG. 4. FIG. 15 is a pattern diagram of the arrangement of the coil 4 on the bobbin 3. In the winding method shown in FIGS. 14 and 15, the wires 2 are wound in such a manner as to advance obliquely together for a lane change corresponding to 2.5 wires (i.e. two and a half wire diameters) on a lower surface side of the core tube 3*a* of the bobbin 3 having four outer surfaces including a pair of upper and lower surfaces and to advance obliquely together for a lane change corresponding to 1.5 wires (i.e. one and a half wire diameters) on an upper surface side (hereinafter, this winding method is referred to as "1.5-2.5 change"). Thus, the lane changes corresponding to a total of four wire diameters are performed on the upper and lower sides of the bobbin 3. This winding method causes the wires 2 to intersect and overlap in three layers in the winding turn-back position as a shaded area shown in FIG. 14B, generating a raised portion as shown by a dot-dashed circular line S1 in FIG. 14D. Further, as shown in FIG. 15, an empty space is created in a winding start position of the coil 4. When the winding is completed at the end of the bobbin 3, two of the four wires 2 are left uncoiled in that winding end position.

Figure 17:
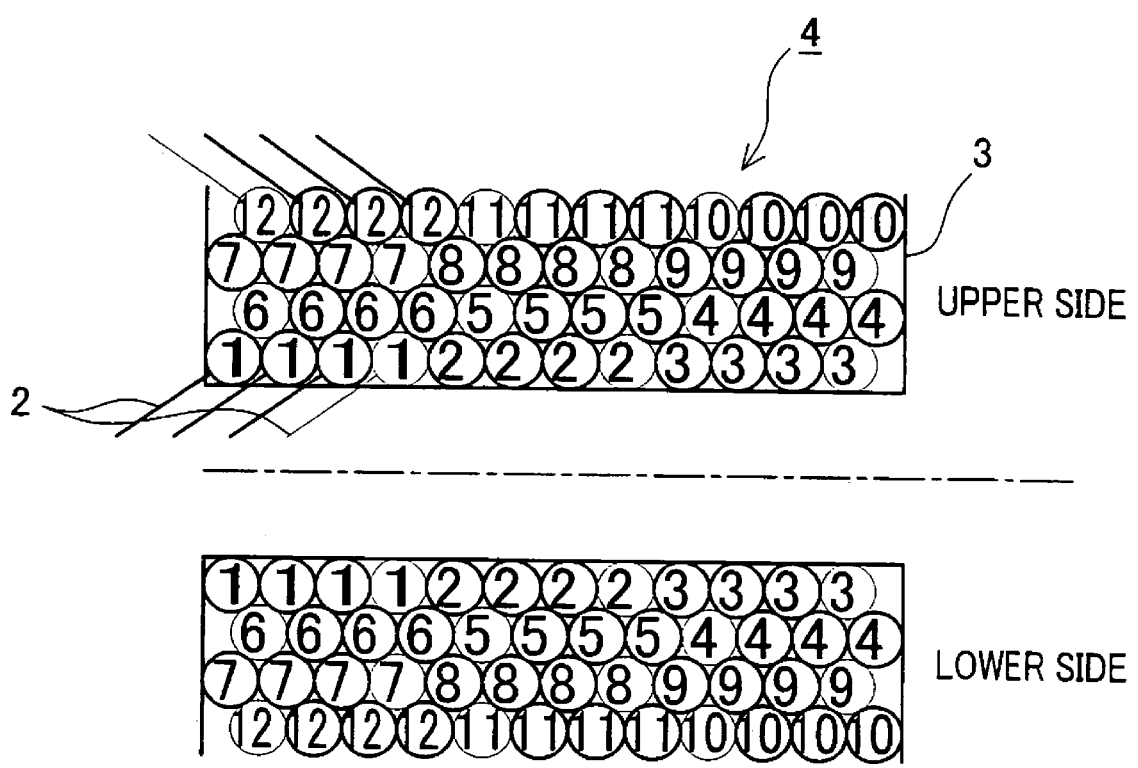
FIG. 17 is a pattern diagram showing another arrangement of the coil on the bobbin.

FIGS. 16A to 16D are views seen from the directions indicated by arrows A, B, C, and D in FIG. 4. FIG. 17 is a pattern diagram of the arrangement of the coil 4 on the bobbin 3. In the winding method shown in FIGS. 16 and 17, the wires 2 are wound in such a manner as to traverse straight for a lane change corresponding to 0 wire (i.e. no lane change) on a lower surface side of the core tube 3*a* of the bobbin 3 having four outer surfaces including a pair of upper and lower surfaces and to advance obliquely together for a lane change corresponding to 4 wires (i.e. four wire diameters) on an upper surface side (hereinafter, this winding method is referred to as "4-0 change"). Thus, the lane changes corresponding to a total of four wire diameters are performed on the upper and lower sides of the bobbin 3. This winding method causes the wires 2 to be twisted 180° in the winding turn-back position for a layer shift, so that the wires 2 intersect and overlap in three layers as a shaded area shown in FIG. 16C, generating a raised portion as shown by a dot-dashed circular line S1 in FIGS. 16A.

According to the rectangular coil unit 1 and the winding method thereof in the present embodiment described above, the 0.5-wire lane change of the wires 2 is performed on the lower surface side of the core tube 3a of the bobbin 3 having four outer surfaces including a pair or upper and lower surfaces and the 3.5-wire lane change is performed on the upper surface side. This winding method in the present embodiment enables less inclination of the wires 2, leading to less intersection of the layered wires 2 of the coil 4 in the vicinity of each flange 3b, 3c of the bobbin 3 at which the winding operation is turned back, as compared with the winding methods shown in FIGS. 8, 10, 12, 14, and 16, namely, the winding methods using the "3-1 change", "2.5-1.5 change", "2-2 change", "1.5-2.5 change", and "4-0 change". Further, differing from the winding methods shown in FIGS. 9, 11, 13, and 15, namely, the winding methods using the "3-1 change", "2.5-1.5 change", "2-2 change", and "1.5-2.5 change", the winding method in the present embodiment does not leave one or two of the wires 2 uncoiled in the winding end position located in the vicinity of each flange 3b, 3c of the bobbin 3 where the winding is completed. Accordingly, in simultaneously regularly winding four wires 2 for the rectangular coil unit 1, it is possible to prevent the generation of a raised portion in the winding turn-back position. This makes it possible to form the coil 4 compact without enlarging the outer size of the coil 4.

Figure 18:
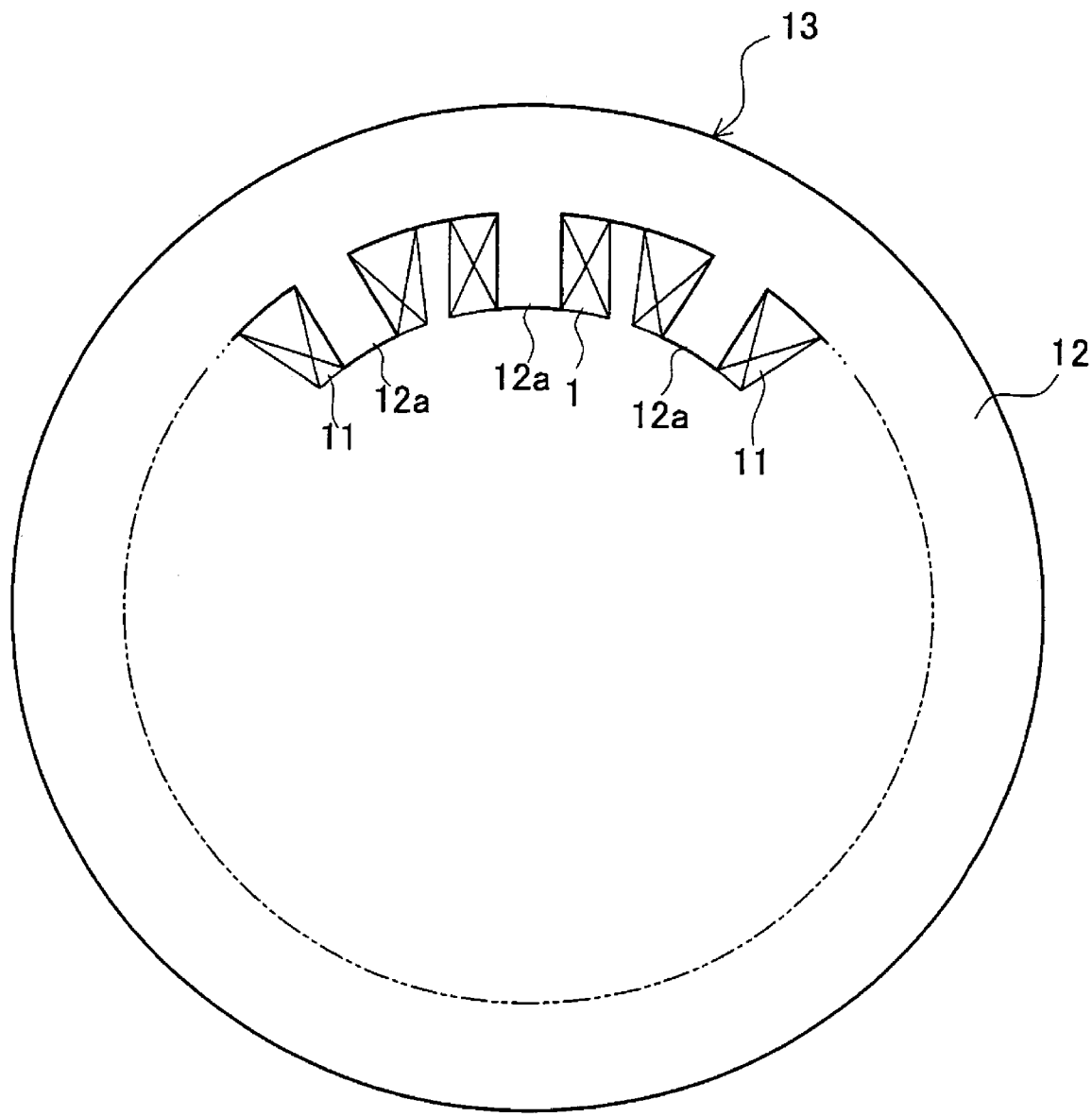
FIG. 18 is a schematic view showing a structure of a stator.
Figure 19:
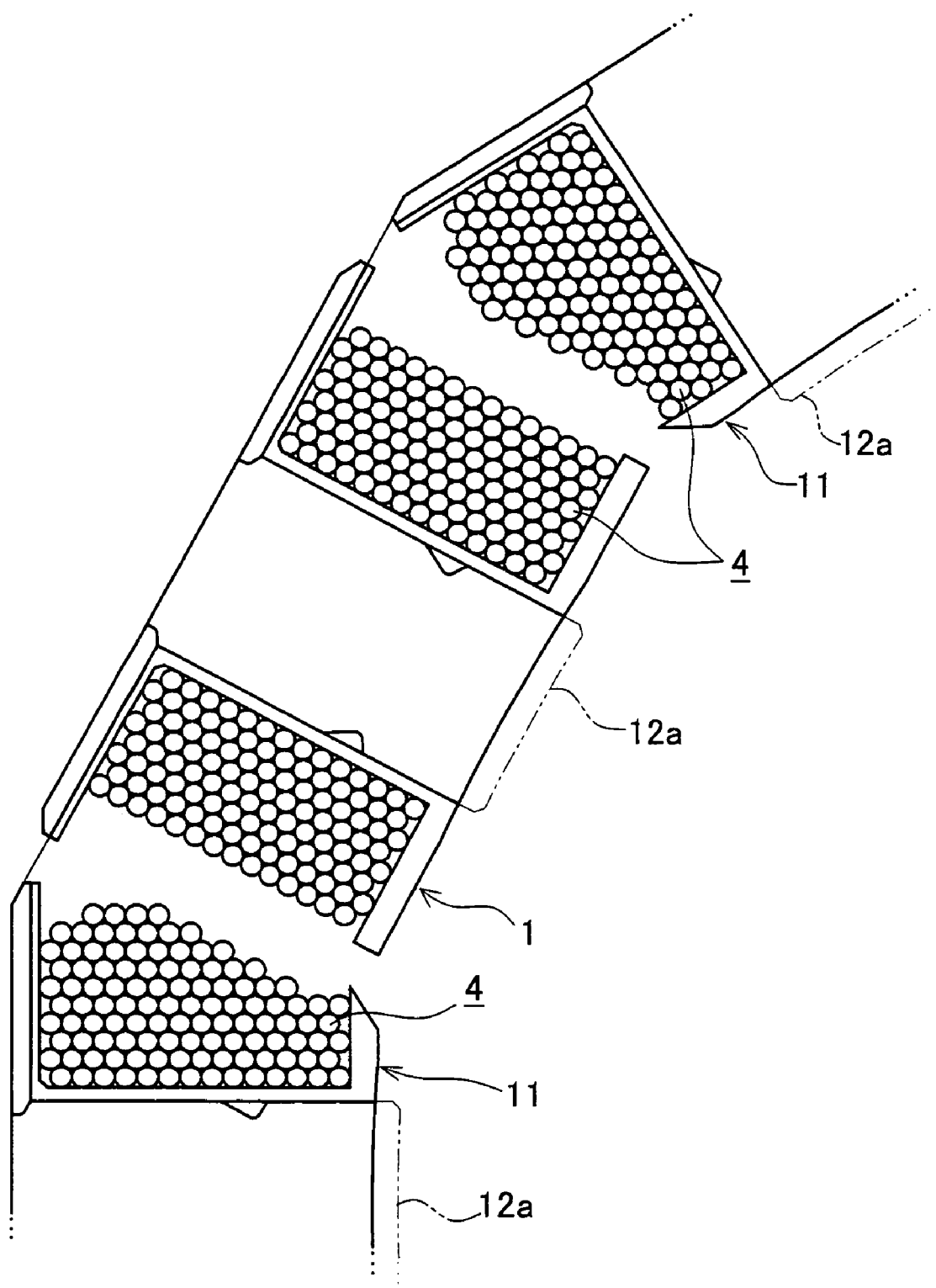
FIG. 19 is a view showing an assembled state of the rectangular coil unit and a trapezoidal coil in the stator.

Here, as shown in FIG. 18 for example, this rectangular coil unit 1 may be mounted in each of teeth 12a of a stator core 12 in such a manner that trapezoidal coil units 11 and rectangular coil units 1 are alternately arranged to constitute a stator 13. As mentioned above, the generation of a raised portion in the winding turn-back position can be restrained, thus making compact the coil 4 of the rectangular coil unit 1. In this case, as shown in an enlarged view in FIG. 19, a predetermined distance can be ensured between the coil 4 of the rectangular coil unit 1 and the coil 4 of the trapezoidal coil unit 11 adjacent thereto. It is therefore possible to increase a space factor in assembly, ensure the insulation between the adjacently arranged coil units 1 and 11, and thus enhance performance of a motor using the above stator 13.

The rectangular coil unit 1 manufactured according to the winding method in the present embodiment is configured so that four wires 2 are simultaneously, regularly wound on the bobbin 3. The eddy-current loss of the rectangular coil unit 1 can therefore be reduced, which contributes to making the motor high-powered. The productivity of the rectangular coil units 1 can also be increased.

The present invention may be embodied in other specific forms without departing from the essential characteristics thereof.

For instance, in the above embodiment, the winding method of the present invention is used to manufacture the rectangular coil unit 1. The winding method of the present invention may be used to manufacture a trapezoidal coil including a coil whose section is trapezoidal. In this case, the same operations and effects can be attained as in the above embodiment.

The invention claimed is:

1. A winding method of regularly winding four wires on a bobbin that is rectangular in section, having a pair of ends in an axis direction and having four outer surfaces including a pair of parallel surfaces, the winding method including sequentially winding the wires in a row in the axis direction and turning back at each of the ends to be reciprocally wound, forming a coil with a plurality of rows and a plurality of layers of the wires, the method comprising the step of:
    winding the wires on the bobbin so that the wires advance obliquely together for a lane change corresponding to 0.5 wire diameters on one of the pair of parallel surfaces and for a lane change corresponding to 3.5 wire diameters on the other one of the pair of parallel surfaces,
    wherein an outermost layer of the plurality of layers forms a uniform profile along an axial direction of the bobbin.

2. The winding method according to claim 1, wherein the winding method is used to manufacture a rectangular coil unit including a coil having a rectangular section.

3. The winding method according to claim 1, wherein the winding method is used to manufacture a trapezoidal coil unit including a coil having a trapezoidal section.

4. A coil unit including four wires regularly wound on a bobbin that is rectangular in section and has a pair of ends in an axis direction and has four outer surfaces including a pair of parallel surfaces, the wires being wound to be sequentially wound in a row in the axis direction and turned back at each of the ends to be reciprocally wound so that the coil unit has a plurality of rows and a plurality of layers of the wires,
    wherein the wires are wound on the bobbin so that the wires advance obliquely together for a lane change corresponding to 0.5 wire diameters on one of the pair of parallel surfaces and a lane change corresponding to 3.5 wire diameters on the other one of the pair of parallel surfaces,
    wherein an outer most layer of the plurality of layers forms a uniform profile along an axial direction on the bobbin.

* * * * *